United States Patent
Tasaka et al.

(10) Patent No.: US 6,872,768 B1
(45) Date of Patent: Mar. 29, 2005

(54) THERMOPLASTIC ELASTOMERIC RESIN GRANULE FOR POWDER MOLDING

(75) Inventors: Michihisa Tasaka, Tokyo (JP); Toshimi Yamanaka, Tokyo (JP)

(73) Assignee: Riken Technos Corporation, Tokyo (JP)

( * ) Notice: Subject to any disclaimer, the term of this patent is extended or adjusted under 35 U.S.C. 154(b) by 0 days.

(21) Appl. No.: 09/958,587

(22) PCT Filed: Apr. 7, 2000

(86) PCT No.: PCT/JP00/02294

§ 371 (c)(1),
(2), (4) Date: Oct. 9, 2001

(87) PCT Pub. No.: WO00/61682

PCT Pub. Date: Oct. 19, 2000

(30) Foreign Application Priority Data

Apr. 9, 1999 (JP) ........................................... 11/139056

(51) Int. Cl.$^7$ ............................. C08K 5/01; C08L 53/02
(52) U.S. Cl. ....................... 524/474; 524/300; 524/476; 524/481; 524/482; 524/483; 524/485; 524/486; 524/505
(58) Field of Search .................................. 524/300, 474, 524/476, 481–483, 485–486, 505

(56) References Cited

U.S. PATENT DOCUMENTS 6,335,095 B1    1/2002  Sugimoto et al. ............ 428/402

FOREIGN PATENT DOCUMENTS

JP          10-81793 A       3/1998
JP          11-60826 A       3/1999

*Primary Examiner*—Peter Szekely
(74) *Attorney, Agent, or Firm*—Pitney Hardin LLP

(57) ABSTRACT

The present invention is a thermoplastic elastomeric resin granule for powder molding having a longer diameter of 400 μm or less and a ratio of the longer diameter to a shorter diameter of from 3:1 to 1:1, wherein said granule comprises a composition prepared by dynamically vulcanizing 100 parts by weight of (a) a block copolymer consisting of at least two polymeric blocks (A) composed mainly of a vinyl aromatic compound and at least one polymeric block (B) composed mainly of a conjugated diene compound, and/or a hydrogenated block copolymer obtained by hydrogenating said block copolymer, 20 to 300 parts by weight of (b) a non-aromatic softening agent for rubber, and 10 to 150 parts by weight of (c) a peroxide-decomposing olefinic resin and/or a copolymer thereof. The resin granule has excellent fluidity in a powder molding.

6 Claims, 5 Drawing Sheets

×10

×60

×10

×60

THERMOPLASTIC ELASTOMERIC RESIN GRANULE FOR POWDER MOLDING

FIELD OF THE INVENTION

The present invention relates to a thermoplastic elastomeric resin granule for powder molding.

PRIOR ART

Rotational powder molding method is widely used to produce a surface skin for automobile interior parts, such as instrumental panels, console boxes and the like. In the method, one can provide molded skin with leather grain patterns or stitches on their surfaces so as to attain softness to touch. In the rotational powder molding, powder should have good fluidity in order to be cast uniformly on a mold surface with a complicated shape, and removed easily if it did not adhere to the mold.

For the purpose of providing thermoplastic elastomeric resin powder having an improved fluidity, various kinds of thermoplastic elastomer and powder thereof were proposed. For example, Japanese Patent Application Laid-Open H10-45976 discloses thermoplastic elastomer powder having a sphere-equivalent average diameter of larger than 0.7 mm to 1.20 mm and a bulk density of at least 0.38, which thermoplastic elastomer is prepared by dynamically vulcanizing a composition comprising a polyolefin resin and ethylene-α-olefin copolymer rubber. Japanese Patent Application Laid-Open H10-81793 discloses powder comprising the aforesaid resin composition and a hydrogenated conjugated diene polymer or a random copolymer of a hydrogenated conjugated diene polymer with a vinyl aromatic compound.

Japanese Patent Application Laid-Open H10-182900 discloses a thermoplastic elastomer for powder slush molding comprising a polypropylene resin, hydrogenated styrene butadiene rubber, a process oil and an elastomer such as styrene/ethylene-propylene/styrene block copolymer and Japanese Patent Application Laid-Open H11-60826 discloses a powdery resin composition comprising a polyolefin type polymer and a hydrogenated diene type polymer, wherein stickiness of the resins is suppressed so as to improve the fluidity.

These powder resins are prepared, for example, in a freeze-crushing method where the resin is frozen with liquid nitrogen or the like and crushed in a mill such as a turbo mill, a roller mill, and a hammer mill, or by extruding a resin through a die into a strand which is then drawn, cooled, and subsequently cut, or by crushing the thermoplastic elastomer at a temperature of its glass transition or below, and then treated with a solvent.

The powder, however, tends still to adhere and coagulate, and still needs improvement in its fluidity. Further, it is not easy to remove an excess charge of the powder which has not adhered to a mold. In addition, the powder is difficult to handle on site and also causes a problem due to dust.

Also, molded articles obtained from the aforesaid thermoplastic elastomers are not satisfactory in oil resistance and abrasion resistance. Where the thermoplastic elastomers are employed for a skin of a molded article, such as an automobile instrumental panel, comprising a core layer made of polyolefin and a middle foam layer made of polyurethane, the skin should be recycled separately from the middle foam layer.

Then, the purpose of the present invention is to solve the fluidity problem in rotational powder molding of a thermoplastic elastomer.

Another purpose of the present invention is to provide a rotational powder molded article of a thermoplastic elastomer, which molded article is excellent in oil resistance and abrasion resistance, and easy to recycle.

SUMMARY OF THE INVENTION

The present inventors have found that fluidity in rotational powder molding can be drastically improved by making a thermoplastic elastomer into granules of a predetermined shape and size instead of conventional powder. Thus, the present invention is a thermoplastic elastomeric resin granule for powder molding having a longer diameter of 400 μm or less and a ratio of the longer diameter to a shorter diameter of from 3:1 to 1:1, wherein said granule comprises a composition prepared by dynamically vulcanizing

- 100 parts by weight of (a) a block copolymer consisting of at least two polymeric blocks (A) composed mainly of a vinyl aromatic compound and at least one polymeric block (B) composed mainly of a conjugated diene compound, and/or a hydrogenated block copolymer obtained by hydrogenating said block copolymer,
- 20 to 300 parts by weight of (b) a non-aromatic softening agent for rubber, and
- 10 to 150 parts by weight of (c) a polypropylene and/or a copolymer composed mainly of propylene.

In a preferred embodiment of the invention, the aforesaid composition is prepared by kneading a composition prepared by dynamically vulcanizing the components (a), (b) and (c), and 10 to 2,500 parts by weight of (d) at least one material selected from the group consisting of polyester polymers and copolymers, polyurethane polymers and copolymers, and polyamide polymers and copolymers, per 100 parts by weight of the component (a).

In another preferred embodiment of the invention, the following components (e) and (f) are also dynamically vulcanized:

- 0.01 to 15 parts by weight of (e) an unsaturated glycidyl compound, and
- 0.01 to 15 parts by weight of (f) an unsaturated carboxylic acid or a derivative thereof, per 100 parts by weight of the component (a).

Preferably, 5 to 100 parts by weight of (g) a polyethylene and/or a copolmer composed mainly of ethylene per 100 parts by weight of the component (a) is also dynamically vulcanized, and more preferably, 1 to 30 parts by weight of (h) a liquid polybutadiene per 100 parts by weight of the component (a) is also dynamically vulcanized.

The present granule may be prepared by an underwater cutting method.

DESCRIPTION OF THE PREFERRED EMBODIMENTS

Figure 1:
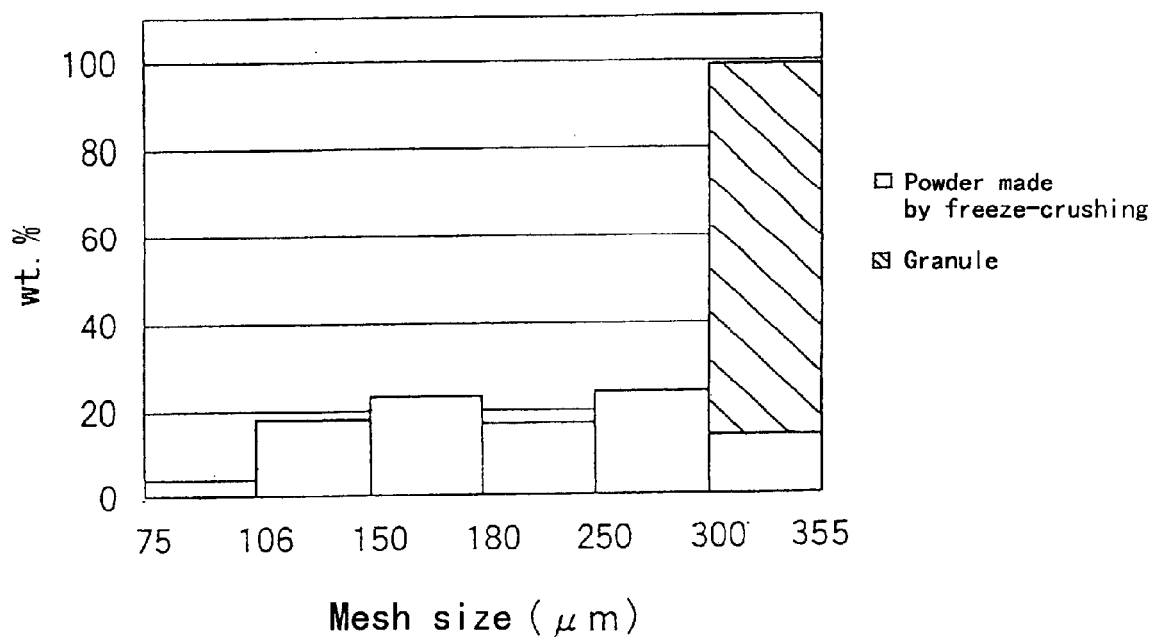
FIG. 1 is a diagram showing size distributions of the present granule and a freeze-crushed powder.

Each component of the present resin composition will be explained in detail.

Component (a), Block Copolymer

Component (a) used in the invention is a block copolymer consisting of at least two polymeric blocks (A) composed mainly of a vinyl aromatic compound and at least one polymeric block (B) composed mainly of a conjugated diene compound, or a hydrogenated block copolymer obtained by hydrogenating the aforesaid block copolymer, or a mixture thereof, such as vinyl aromatic compound-conjugated diene compound block copolymers having a structure, A-B-A, B-A-B-A or A-B-A-B-A, or those obtained by hydrogenating such. From such a block copolymer, a granule having a diameter almost as large as that of an extruder die can be obtained. The block copolymer and/or the hydrogenated block copolymer (hereinafter referred to as (hydrogenated) block copolymer) contains 5 to 60% by weight, preferably 20 to 50% by weight, of a vinyl aromatic compound. Preferably, the polymeric block A composed mainly of a vinyl aromatic compound consists solely of a vinyl aromatic compound or is a copolymeric block comprising more than 50% by weight, preferably at least 70% by weight, of a vinyl aromatic compound and a conjugated diene compound and/or a hydrogenated conjugated diene compound (hereinafter referred to as (hydrogenated) conjugated diene compound).

Preferably, the polymeric block B composed mainly of a (hydrogenated) conjugated diene compound is composed solely of a (hydrogenated) conjugated diene compound or is a copolymeric block comprising more than 50% by weight, preferably at least 70% by weight, of a (hydrogenated) conjugated diene compound with a vinyl aromatic compound.

The vinyl compound or the (hydrogenated) conjugated diene compound may be distributed at random, in a tapered manner (i.e., a monomer content increases or decreases along a molecular chain), in a form of partial block or mixture thereof in the polymeric block A composed mainly of a vinyl aromatic compound or the polymeric block B composed mainly of a (hydrogenated) conjugated diene compound. When two or more of the polymeric block A composed mainly of a vinyl aromatic compound or two or more of the polymeric block B composed mainly of a (hydrogenated) conjugated diene compound are present, they may be same with or different from each other in structure.

The vinyl aromatic compound to compose the (hydrogenated) block copolymer may be one or more selected from, for instance, styrene, α-methyl styrene, vinyl toluene and p-tert.-butyl styrene, preferably styrene. The conjugated diene compound may be one or more selected from, for instance, butadiene, isoprene, 1,3-pentadiene, and 2,3-dimethyl-1,3-butadiene, preferably butadiene and/or isoprene.

Any microstructure may be selected in the polymeric block B composed mainly of the conjugated diene compound. It is preferred that the butadiene block has 20 to 50%, more preferably 25 to 45%, of 1,2-micro structure. In the polyisoprene block, it is preferred that 70 to 100% by weight of isoprene is in 1,4-micro structure and at lest 90% of the aliphatic double bonds derived from isoprene is hydrogenated.

A weight average molecular weight of the (hydrogenated) block copolymer with the aforesaid structure to be used in the invention is preferably 5,000 to 1,500,000, more preferably 10,000 to 550,000, further more preferably 100,000 to 550,000, particularly 100,000 to 400,000. A ratio of the weight average molecular weight (Mw) to the number average molecular weight (Mn), Mw/Mn, is preferably 10 or less, more preferably 5 or less, particularly 2 or less.

Molecule structure of the (hydrogenated) block copolymer may be linear, branched, radial or any combination thereof.

Many methods were proposed for the preparation of such block copolymers. As described, for instance, in JP Publication 40-23798/1965, block polymerization may be carried out using a lithium catalyst or a Ziegler catalyst in an inert solvent. The hydrogenated block copolymer may be obtained by hydrogenating the block copolymer thus obtained in the presence of a hydrogenation catalyst in an inert solvent.

Examples of the (hydrogenated) block copolymer include SBS, SIS, SEBS and SEPS. A particularly preferred (hydrogenated) block copolymer in the invention is a hydrogenated block copolymer with a weight average molecular weight of 50,000 to 550,000 which is composed of polymeric block A composed mainly of styrene and polymeric block B which is composed mainly of isoprene and in which 70 to 100% by weight of isoprene has 1,4-microstructure and 90% of the aliphatic double bonds derived from isoprene is hydrogenated. More preferably, 90 to 100% by weight of isoprene has 1,4-microstructure in the aforesaid hydrogenated block copolymer.

Component (b), Non-Aromatic Softening Agent for Rubber

Non-aromatic mineral oils and non-aromatic softening agents liquid or low molecular weight synthetic may be used as component (b) of the invention. Mineral oil softening agents used for rubber are mixtures of aromatic cyclic ones, naphthenic cyclic ones and paraffinic ones. Those in which 50% or more of the whole carbon atoms is in paraffinic chains are called a paraffinic type; those in which 30 to 40% of the whole carbon atoms is in naphthenic rings are called a naphthenic type; and those in which 30% or more of the whole carbon atoms is in aromatic rings are called an aromatic type.

Mineral oil softening agents for rubber to be used as component (b) according to the invention are of the aforesaid paraffinic or naphthenic type. Aromatic softening agents are improper, because they make component (a) soluble and hinder the crosslinking reaction so that physical properties of a composition obtained are not improved. Paraffinic ones are preferred as component (b). Among the paraffinic ones, those with a less content of aromatic cyclic components are particularly preferred.

The non-aromatic softening agents for rubber have a kinetic viscosity at 37.8° C. of 20 to 500 cSt, a pour point of −10 to −15° C. and a flash point (COC) of 170 to 300° C.

The amount of the component (b) to be blended is 20 to 300 parts by weight, preferably 40 to 300 parts by weight, more preferably, 80 to 200 parts by weight, most preferably 100 to 170 parts by weight, per 100 parts by weight of the component (a). If the amount is higher than 300 parts by weight, the softening agent tends to bleed out to possibly make a final product sticky and be worse in mechanical properties. If the amount is less than 20 parts by weight, a resultant composition shows worse moldability. Component (b) preferably has a weight average molecular weight of 100 to 2,000.

Component (c), Polypropylene or a Copolymer Composed Mainly of Propylene.

Component (c) attains an effect of improving dispersion of the rubber in the composition obtained to thereby improve appearance of a molded article. Component (c) is blended in an amount of 10 to 150 parts by weight, preferably 25 to 100 parts by weight, for 100 parts by weight of component (a). If the amount is less than 10 parts by weight, moldability of the elastomer composition obtained is deteriorated. If it exceeds 150 parts by weight, softness and rubber elasticity of the elastomer composition are deteriorated.

A Polypropylene and/or a copolymer composed mainly of propylene suitable as component (c) in the present invention has at least 20% of rrrr/1-mmmm in a pentad ratio in a $^{13}$C— nuclear magnetic resonance method and a fusion peak temperature (Tm) of at least 150° C., preferably 150 to 167° C., and fusion enthalpy (ΔHm) of at most 100 J/g, preferably 25 to 83 mJ/mg, as determined by differential scanning calorimetry (DSC). Crystallinity may be estimated from Tm and ΔHm. If Tm and ΔHm are out of the aforesaid ranges, rubber elasticity at 100° C. or higher of the elastomer composition obtained is not improved.

Polypropylene and/or a copolymer composed mainly of propylene suitable as component (c) in the present invention is high molecular weight propylene homopolymers such as isotactic polypropylenes, or copolymers of propylene with a smaller amount of other α-olefine such as ethylene, 1-butene, 1-hexene or 4-methyl-1-pentene. These resins preferably have an MFR (ASTM D-1238, Condition L, 230° C.) of 0.1 to 10 g/10 min., more preferably 3 to 8 g/10 min.

If the MFR of the polypropylene and/or a copolymer composed mainly of propylene is less than 0.1 g/10 mm., moldability of the elastomer composition obtained is deteriorated. If it exceeds 10 g/10 min., rubber elasticity of the elastomer composition obtained is deteriorated.

In addition to those described above, use may be made of a polypropylene and/or a copolymer composed mainly of propylene composed of boiling heptane-soluble polypropylene having a number average molecular weight (Mn) of at least 25,000 and a ratio of Mw to Mn, Mw/Mn, of at most 7 and boiling heptane-insoluble polypropylene having a melt index of 0.1 to 10 4 g/10 min. or a polypropylene and/or a copolymer composed mainly of propylene composed of boiling heptane-soluble polypropylene having an intrinsic viscosity [η] of at least 1.2 dl/g and boiling heptane-insoluble polypropylene having an intrinsic viscosity [η] of 0.5 to 9.0 dl/g.

Component (d), Polyester Type (Co)Polymer, Polyamide Type (Co)Polymer or Polyurethane Type (Co)Polymer In the present invention, the polyester type (co)polymer, polyamide type (co)polymer or polyurethane type (co) polymer is not restricted to particular one and any polymer and copolymer may be used satisfactorily. The copolymers may be a block or graft copolymer. The (co)polymers are preferred to have elastomeric properties. Commercially available polymers may be used satisfactorily. The aforesaid copolymers are particularly preferred. The aforesaid (co) polymers may be used alone or in a combination. Examples of the polyester type (co)polymer include (co)polymers in which a hard component is an aromatic polyester and a soft component is an aliphatic polyether, or in which a hard component is an aromatic polyester and a soft component is an aliphatic polyester, or in which a hard component is polybutylene naphthalate and a soft component is an aliphatic polyether. Examples of the polyamide type (co) polymer include nylon-6, nylon-6,6, nylon-4,6, nylon-6,10, nylon-6,12, and block elastomers in which a hard component is polyamide and a soft component is polyetherr, or a hard component is polyamide and a soft component is polyetherester, wherein the polyamide is nylon-6 or nylon-12. Examples of the polyurethane type (co)polymer include lactone type, ester type or ether type (co)polymers.

The amount of the component (d) to be blended is at least 1.0 part by weight, preferably at least 100 parts by weight, more preferably at least 500 parts by weight and is at most 2,500 parts by weight, preferably at most 1,500 parts by weight, per 100 parts by weight of the component (a). Particularly, it is preferred that polyester type (co)polymer is blended at least 150 parts by weight; polyamide type (co) polymer is blended at least 100 parts by weight; and polyurethane type (co)polymer is blended at least 200 parts by weight. If the amount is more than 2,500 parts by weight, softness of the elastomer composition obtained is decreased to be little different from that of polyester type (co)polymer, polyamide type (co)polymer or polyurethane type (co) polymer.

In the present invention, blending of the component (d) drastically improves oil resistance and stain resistance of a molded article. In addition, an automobile interior part consisting of a skin layer made of the present composition containing the urethane (co)polymer, an olefin core layer, and a middle foam layer made of urethane foam can be recycled by crushing the part altogether.

Component (e), Unsaturated Glycidyl Compound or Derivative Thereof

By subjecting the unsaturated glycidyl compound or derivative thereof to the dynamic vulcanization, the resultant resin composition has improved oil resistance and improved abrasion resistance. Preferably, a glycidyl compound having an unsaturated functional group which functional group may copolymerize with olefin, and a glycidyl group is used, such as, particularly, glycidyl methacrylate. Preferably, polyethylene and polypropylene are modified by the unsaturated glycidyl compound or derivative thereof. That is, a soft component of the component (a), hydrogenated block copolymer, and component (c), peroxide-decomposing olefinic resin and/or a copolymeric rubber containing said resin, are modified.

Component (e) is blended in an amount of at most 15 parts by weight, preferably at most 10 parts by weight, and at least 0.01 part by weight, preferably at least 0.1 part by weight, more preferably at least 3 parts by weight, for 100 parts by weight of component (a). If the amount exceeds the upper limit, heat deformation resistance and mechanical properties of the composition are deteriorated and, in addition, the effect of improving compatibility of component (d), if blended, is not observed.

Component (f), Unsaturated Carboxylic Acid or Derivative Thereof

By subjecting the unsaturated carboxylic acid or derivative thereof to dynamic vulcanization, the resultant resin composition has improved oil resistance and abrasion resistance. Preferred examples of the unsaturated carboxylic acid or derivative thereof include acrylic acid, methacrylic acid, maleic acid, dicarboxylic acid or derivatives thereof such as acids, halides, amides, imides, anhydrides or esters. Particularly, maleic anhydride (MAH) is preferably used. Preferably, polypropylene and the like are modified by the unsaturated carboxylic acid or derivative thereof. That is, it is believed that a soft component in component (a), hydrogenated block copolymer, and component (c), polypropylene and/or a copolymer composed mainly of propylene are modified.

Component (f) is blended in an amount of at most 15 parts by weight, preferably at most 10 parts by weight, and at least 0.01 part by weight, preferably at least 0.1 part by weight, more preferably at least 5 parts by weight, per 100 parts by weight of component (a). If the amount exceeds the upper limit, conspicuous yellowing occurs in the composition and heat deformation resistance and mechanical properties of the composition deteriorate and, in addition, the effect of improving compatibility of component (d) is not observed.

Component (g), Polyethylene and/or A Copolymer Composed Mainly Of Ethylene

As the polyethylene and/or a copolymer composed mainly of ethylene, use may be made of one or more resin selected from the group consisting of polyethylene such as high density polyethylene (polyethylene prepared in a low pressure method), low density polyethylene (polyethylene prepared in a high pressure method), linear low density polyethylene (copolymers of ethylene with a smaller amount of α-olefin such as butene-1, hexene-1 or octene-1); and olefinic copolymers such as ethylene-propylene copolymer, ethylene-vinyl acetate copolymer, ethylene-acrylate copolymer. Particularly preferred are an ethylene-octene copolymer having a density of at most 0.90 g/cm$^3$ and ethylene-hexene copolymer having a density of at least 0.90 g/cm$^3$ which are prepared using a metallocene catalyst (single site catalyst). When $T_m$ of these copolymer is not higher than 100° C., it is necessary to add by the time of crosslinking at the latest to crosslink them. $T_m$ disappears by the crosslinking and, therefore, fusion of octene or hexene does not occur.

One example of the component (g) is an olefinic polymer which is prepared using a catalyst for olefin polymerization which is prepared in accordance with the method described in Japanese Patent Application Laid-Open Sho-61-296008, which catalyst is composed of a carrier and a reaction product of metallocene having at least one metal selected from the 4b group, 5b group and 6b group in the periodic table with alumoxane, the reaction product being formed in the presence of the carrier.

Another example of the component (g) is an olefinic polymer prepared using a metal coordinated complex described in Japanese Patent Application Laid-Open Hei-3-163008, which metal coordinated complex contains a metal selected from the group 3 (except scandium), groups 4 to 10 and the lanthanoid group and a delocalized π-bonding part substituted by a constrained inducing part, and is characterized in that said complex has a constrained geometrical form around said metal atom, and a metal angle between a center of the delocalized substituted π-bonding part and a center of at least one remaining substituted part is less than that in a comparative complex which is different from it only in that a constrained inducing substituted part is substituted with a hydrogen, and wherein in each complex having further at least one delocalized substituted π-bonding part, only one, per metal atom, of the delocalized substituted π-bonding parts is cyclic.

Modified resin may also be used at need. Examples of such include (co)polymers modified with, for example, maleic anhydride, glycidyl methacrylate, allylglycidylether, oxazolyl methacrylate, allyloxazolylether, carboxylmethacrylate, allylcarboxylether, and polymethylmethacrylate graft copolymers. Among these, an ethylene-glycidyl methacrylate copolymer and a copolymer of maleic anhydride modified ethylene with glycidyl methacrylate are preferred.

The component (g) preferably has MFR determined at 190° C. and a load of 2.16 kg of 0.1 to 10.0 g/10 min., more preferably 0.3 to 5.0 g/10 min. Component (g) is blended in an amount of at most 100 parts by weight, preferably at most 50 parts by weight, and preferably at least 5 parts by weight, more preferably at least 10 parts by weight, per 100 parts by weight of the component (a). If the amount exceeds the upper limit, softness of the resultant elastomer composition is lost and bleedout of the softening agent (b) tends to occur.
Component (h), Liquid Polybutadiene Liquid polybutadiene is a polymer in which microstructure of a main chain is composed of vinyl 1,2-bonding, trans 1,4-bonding and cis 1,4-bonding and which is a transparent liquid at room temperature. The vinyl 1,2-bonding amounts to preferably 30% by weight or less. If the vinyl 1,2-bonding exceeds 30% by weight, the properties of the composition obtained tends to deteriorate.

A number average molecular weight of the liquid polybutadiene is preferably at most 5,000, more preferably at most 4,000, and preferably at least 1,000, more preferably at least 3,000. If the number average molecular weight is below the lower limit, the heat deformation resistance of the composition obtained tends to become worse. If it exceeds the upper limit, the compatibility in the composition obtained tends to become worse.

The liquid polybutadiene is preferably a copolymerizable compound having one or more groups selected from epoxy, hydroxyl, isocyanate and carboxyl groups. Among these, one having a hydroxyl group and a copolymerizable unsaturated double bond is particularly preferred, such as R-45HT, trade mark, ex Idemitsu Petrochemical Co.

Component (h) is blended in an amount of at most 30 parts by weight, preferably at most 10 parts by weight, and at least 1 part by weight, preferably at least 3 parts by weight, per 100 parts by weight of component (a). If the amount is below the lower limit, effects of blending is not observed, while if it exceeds the upper limit, the mechanical properties of the composition is deteriorated.
Organic Peroxide In the present invention, the components except component (d) are subjected to dynamic vulcanization to thereby enable one to obtain granules having almost the same diameter as that of the die. Examples of the organic peroxides used in the invention include dicumyl peroxide, di-tert.-butyl peroxide, 2,5-dimethyl-2,5-di(tert.-butylperoxy) hexane, 2,5-dimethyl-2,5-di(tert.-butylperoxy) hexine-3, 1,3-bis(tert.-butylperoxyisopropyl) benzene, 1,1-bis(tert.-butylperoxy)-3,3,5-trimethylcyclohexane, n-butyl-4,4-bis (tert.-butylperoxy)valerate, benzoylperoxide, p-chlorobenzoyl peroxide, 2,4-dichlorobenzoyl peroxide, tert.-butylperoxy benzoate, tert.-butylperoxyisopropyl carbonate, diacetyl peroxide, lauroyl peroxide, and tert.-butylcumyl peroxide.

Among those, most preferred are 2,5-dimethyl-2,5-di (tert.-butylperoxy)hexane, 2,5-dimethyl-2,5-di(tert.-butylperoxy) hexine-3 and 1,3-bis(tert.-butylperoxyisopropyl)benzene in terms of smell, coloring and scorch stability.

The amount of the peroxide to be added is at least 0.1 parts by weight, preferably at least 0.2 parts by weight, more preferably 0.6 parts by weight, and at most 3.0 parts by weight, preferably at most 2.5 parts by weight per 100 parts by weight of component (a). If the amount is less than 0.1 parts by weight, the required crosslinkage may not be obtained, while if the amount exceeds 3.0 parts by weight, the crosslinking proceeds too much, causing poor dispersion of the crosslinked materials.
Crosslinking Aid In the dynamic vulcanization in the present invention, it is preferred to use a crosslinking aid. The amount of the crosslinking aid is at least 0.1 part by weight, preferably at least 1.0 parts by weight, more preferably at least 2.0 parts by weight, and at most 10.0 parts by weight, preferably at most 8.0 parts by weight, more preferably 6.0 parts by weight per 100 parts by weight of the component (a). If the amount is less than 0.1 part by weight, the crosslinking may not occur sufficiently, and, if it exceeds 10 parts by weight, the crosslinking efficiency tends to decrease. It is preferred that the amount of the crosslinking aid added is about 1.0 to 3.0 times as large as the amount of the peroxide added.

In addition to the aforesaid components, the composition according to the present invention may contain, if necessary, pigments, inorganic fillers, anti-oxidants, inorganic or organic blowing agents, flame-retardant such as hydrated metal compounds, red phosphorus, ammonium polyphosphate, antimony, and silicone.

The present granule may be prepared by, for example, the following processes. In a first step, the components except component (d), e.g., polyurethane resin, are kneaded under heating with a crosslinking agent being added. Preferably, a crosslinking aide is also added. Any conventional means for kneading rubbers or plastics may be used satisfactorily, such as single screw extruders, twin screws extruders, rolls, Banbury mixers, and various kneaders. In this process, a composition is obtained where each component is uniformly dispersed.

In the next step, the component (d), if desired, is added to the product of the first step and kneaded. Generally, the kneading is performed in a single screw extruder, twin screws extruder, rolls, Banbury mixer, or various types of kneader. In this step, each component is further dispersed and at the same time the crosslinking reaction completes. It is advantageous to side feed the component (d) to thereby perform this step consecutively after the dynamic vulcanization.

A twin screws extruder with an L/D ratio of 47 or more or a Banbury mixer is preferred as the kneading means, because all of the steps may be carried out continuously. For instance, when a twin screws extruder is operated at a screw rotation speed of 80 to 350 rpm, preferably 80 to 200 rpm, each component is dispersed well to give good properties.

Figure 2:
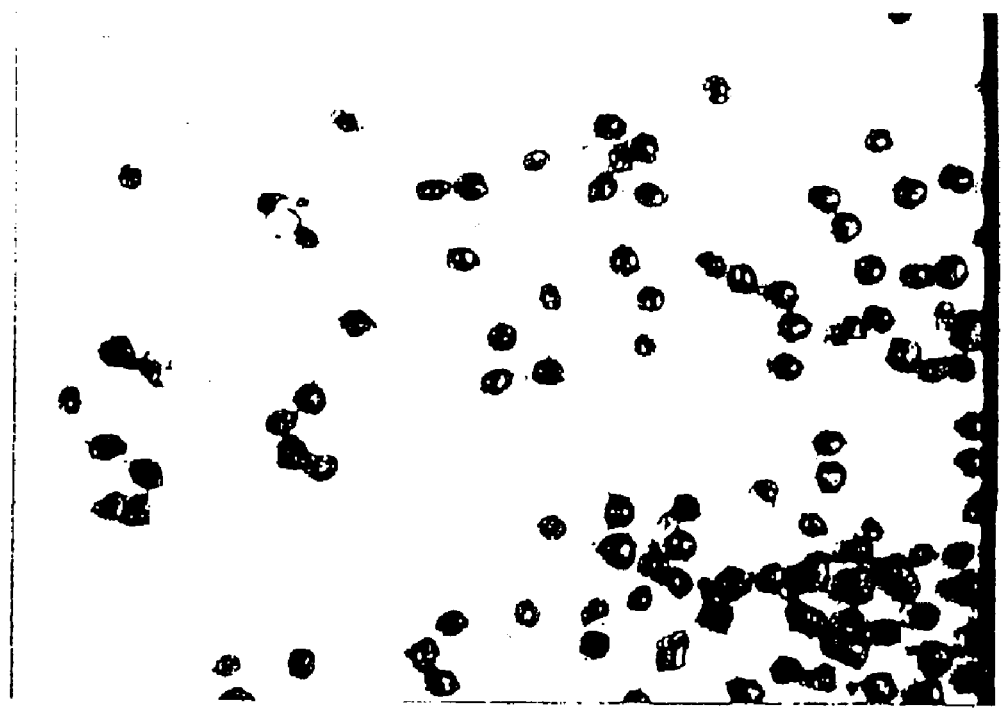
FIG. 2 is a microphotograph of the present granule at a 10× magnification.
Figure 3:
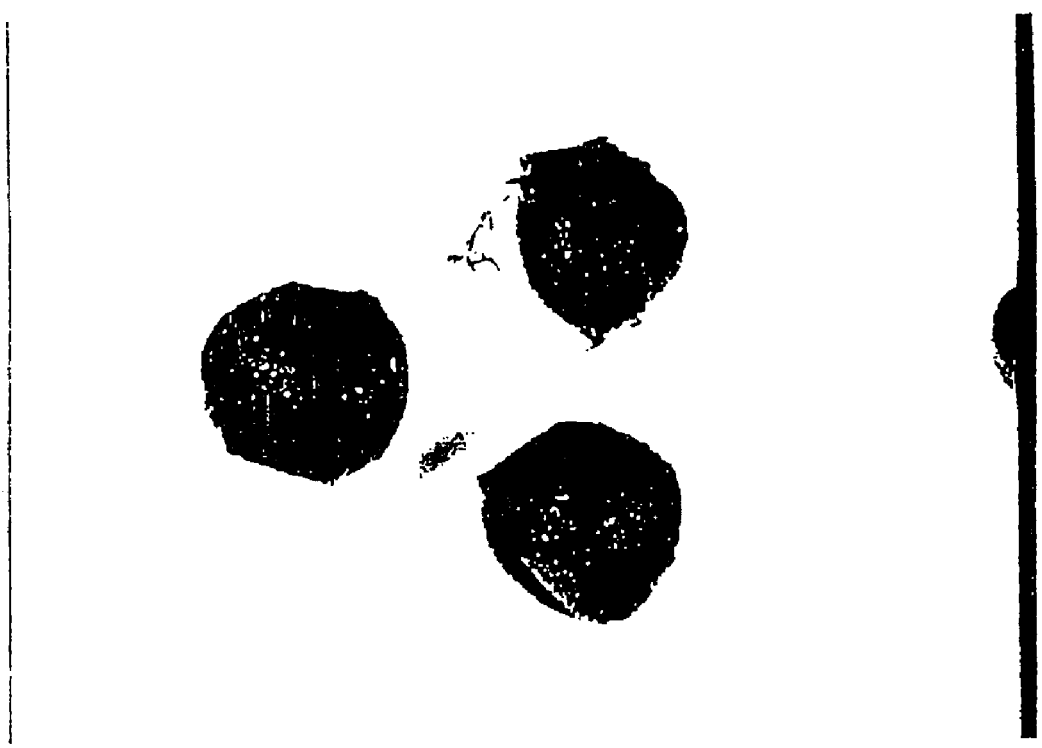
FIG. 3 is a microphotograph of the present granule at a 60× magnification.
Figure 4:
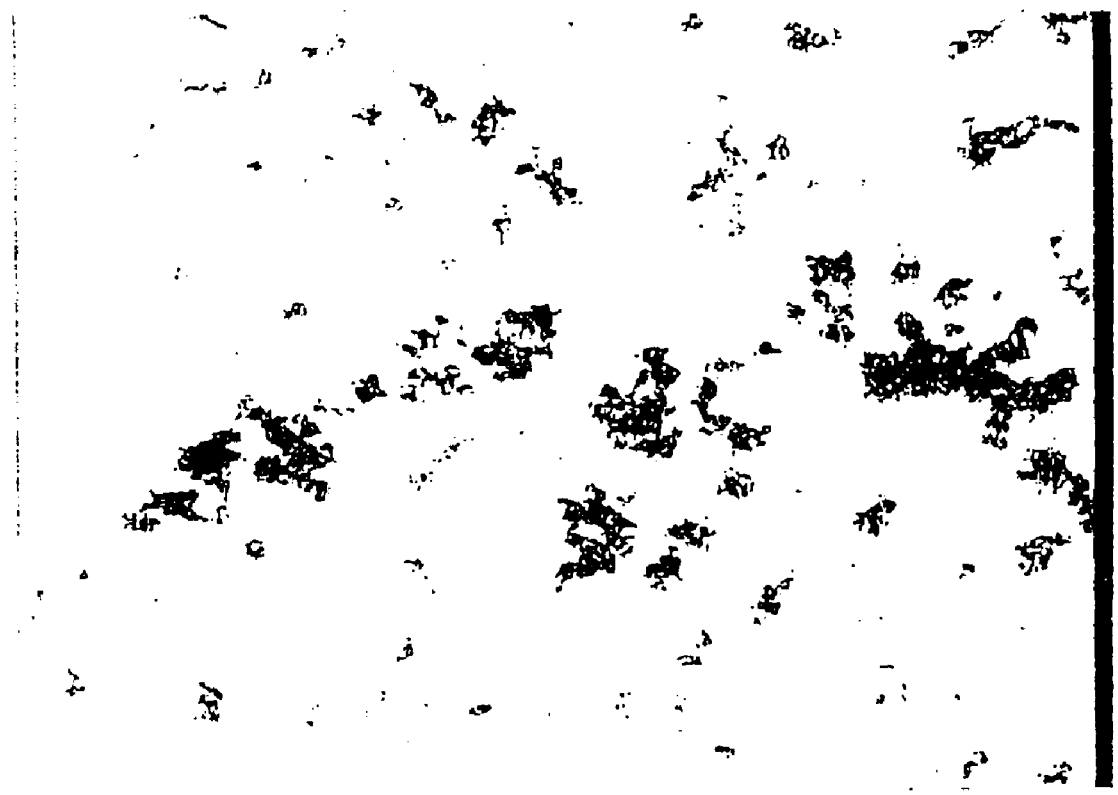
FIG. 4 is a microphotograph of a freeze-crushed powder at a 10× magnification.
Figure 5:
FIG. 5 is a microphotograph of a freeze-crushed powder at a 60× magnification.

The present granule has a somewhat elongated spherical shape as shown in the microphotographs (FIGS. 2 and 3). Because the shape is substantially spherical, good fluidity is attained. The terms "longer diameter" of the granule herein means the longest diameter seen in a microphotographs at about 20–30× magnification. A range of the longer diameter may be determined according to a mold shape, resin components and so on. The longer diameter should be small enough for the granule to be cast in every corner of a mold without voids. However, if it is too small, advantages over conventional powder in the fluidity or handling properties are considered to be lost. In rotational powder molding of an automobile interior parts, the longer diameter is preferably 400 μm or smaller, and more preferably 360 μm or smaller. Further, a ratio of the longer diameter to the shorter diameter, i.e., the shortest diameter of the diameters perpendicular to the longer diameters in the microphotographs of the granule, is 3:1 or less, preferably 2:1 or less, more preferably 1.5:1 or less.

The above-mentioned granule may be prepared by an underwater cutting method. In the underwater cutting method, granules are obtained by extruding the thermoplastic elastomer composition into water through an extruder die and cutting the extruded resin with blades provided in the close proximity of the die. In the present invention, a cutting system, for example, Underwater Pelletizing Systems, ex Gala Industries Inc., is connected to an extruder, where the extruded resin composition is immediately cooled and cut. To obtain granules of the size specified in the present invention, an output aperture of the die is 3 mm or smaller, preferably 1.0 mm or smaller, more preferably 0.3 mm or smaller. A throughput of the thermoplastic elastomeric composition per output port of the die is typically 10 to 250 g/hr, preferably 20 to 100 g/hr. A temperature of the water is typically 5 to 80° C., preferably 5 to 40° C. to prevent blocking of the die with the resin. An anti-blocking agent may be added to the water.

Besides the underwater cutting method, other methods may be used where a molten resin composition is atomized by a spray or an atomizer and then cooled into granules.

EXAMPLES

The present invention is further elucidated with reference to the following Examples and Comparative Examples. The values in the Tables are expressed in parts by weight, unless otherwise indicated.

The following materials were used in the Examples and Comparative Examples.

Component (a): hydrogenated block copolymer(SEPS-1), Septon 4077, ex Kuraray Co.,
  styrene content: 30% by weight,
  isoprene content: 70% by weight,
  number average molecular weight: 260,000,
  weight average molecular weight: 320,000,
  polydispersity: 1.23, and
  hydrogenation ratio: at least 90%.

Component (a): hydrogenated block copolymer(SEPS-2), Septon 2063, ex Kuraray Co.,
  styrene content: 13% by weight,
  isoprene content: 87% by weight,
  weight average molecular weight: 65,000,
  hydrogenation ratio: at least 90%.

Component (b): softening agent for rubber, Diana Process Oil, PW-90, ex Idemitsu Kosan Co.,
  tape: paraffinic oil,
  weight average molecular weight: 540, and
  aromatic component content: 0.1% or lower.

Component (c): polypropylene and/or a copolymer composed mainly of propylene PP, CJ700, trade mark, ex Mitsui Petrochemical Industries Inc.,
  Type: Polypropylene (PP)
  MFR: 7 g/10 min.,
  Crystallinity: Tm 166° C., ΔHm 82 J/mg.

Component (d):
  thermoplastic polyester type elastomer:
    Hytrel 4068 (trade mark), ex Toray-DuPont Inc.,
  thermoplastic polyamide type elastomer:
    Pebax 5533SNOO (trade mark), ex Toray Inc.,
  thermoplastic polyurethane type elastomer:
    Elastran 1180A50 (trade mark), ex Takeda-Badisch Urethane Component (e): glycidyl methacrylate, ex Kanto Kagaku Co.

Component (f): maleic anhydride, ex Kanto Kagaku Co.

Component (g): polyethylene and/or a copolymer composed mainly of ethylene Engage EG8150, ex Dow Chemical Japan Ltd,
  type: metallocene catalyst type polyethylene (ethylene-octene copolymer)
  density: 0.868 g/cm$^3$.

Component (h): liquid polybutadiene, R-45HT (trademark), ex Idemitsu Petrochemical Industries Inc., having hydroxyl groups (acrylic type, primary) and copolymerization-reactive unsaturated double bonds (1,4 bonds: 80%). The number average molecular weight is 2,800.

Organic Peroxide: Peroxa 25B (2,5-dimethyl-2,5-di(t-butylperoxide)hexane, ex Nihon Ushi Co.

Crosslinking Aid: NK Ester IND (mixture of 85% of 2-methyl-1,8-octanedioldimethacrylate and 15% of 1,9-nonanedioldimethacrylate).

Hydrogenated Styrene-butadiene Random Copolymer:
Dynalon 1320P (trade mark),
styrene content: 10 wt %, and
MFR (230° C., 2.16 kgf): 3.5 g/10 min.
Polyvinyl Chloride Resin Compound:
  polyvinyl chloride resin (straight resin), P-700, ex Shinnetsu Chemical Co., degree of polymerization of 700, 100 parts by weight,
  pasty polyvinyl chloride resin (paste resin), PSL-10, ex Kanegahuchi Chemical Co., degree of polymerization 1000, 17.6 parts by weight,
  trimellitic acid ester type plasticizer, W-705, ex Dainippon Ink & Chemical Inc., 76.5 parts by weight,
  epoxidized soy bean oil, O-130, ex. Asahidenka Industries Co., 5.9 parts by weight,
  Ba-Zn type stabilizer 5.9 parts by weight, and
  stearic acid 0.2 parts-by weight.
Completely Crosslinked Olefinic Elastomer: Santplane 111-73, ex A.E.S. Japan Ltd.
Polyurethane resin: Pandex T-7890N (polycarbonate type), ex Dainippon Ink &Chemical Inc.
Preparation Method The components except component (d) were kneaded in the weight ratios shown in Table 1 with a twin-screw extruder. Then, the peroxide and the crosslinking aid were added and subjected to dynamic vulcanization at a kneading temperature of 200° C., a screw rotation of 350 rpm and an extruder throughput of 20 kg/hr. After that, component (d) was side-fed and kneaded in Examples 2–9. At the exit of the extruder, a unit of Underwater Pelletizing Systems, ex Gala Industries, Inc., was installed to prepare granules having a longer diameter of about 0.3 mm.

In the Comparative Examples, the vulcanized compound was freeze-crushed and screened with a 42-mesh screen. A fraction of the powder which passed a 42-mesh screen was collected as a sample.

The samples obtained were tested for fluidity and moldability. The molded articles from the samples were tested for abrasion resistance and oil resistance. The test methods are as described below. The results obtained are as shown in Table 1.

Test Method and Evaluation Criteria
1. Powder Fluidity Test

Fifty grams of each sample were put in a bulk density meter specified in Japanese Industrial Standards (JIS) K6721. After a damper of the density meter was opened, a time needed for an entire volume of a sample to flow out was measured.

Evaluation Criteria
  ⊚: shorter than 15 seconds
  ○: shorter than 30 seconds
  Δ: shorter than 60 seconds
  x: 60 seconds or longer 2. Abrasion Resistance Test An amount abraded was measured according to JIS K7204.

Evaluation Criteria
  ⊚: less than 50 mm³
  ○: less than 100 mm³
  Δ: less than 150 mm³
  x: 150 mm³ or more 3. Oil Resistance Test A molded article was immersed in IRM No.902 oil at 120° C. for 72 hours and a volume change ratio relative to the original volume was measured.

Evaluation Criteria
  ⊚: smaller than 30%
  ○: smaller than 50%
  Δ: smaller than 100%
  x: 100% or larger 4. Moldability Test The granules obtained were put in a mold of 40 mm deep with a bottom of 145 mm×145 mm and an opening of 165 mm×165 mm. The mold had a leather-like grain pattern on its inner surface. At that time, a temperature of the mold was 250° C. The opening of the mold was closed with another mold and fixed together. The pair of the molds was rotated in a reciprocating manner of 90 degrees around a rotational axis of a single axis rotating instrument to let granules melt and adhere to the surface of the mold. Then, the granules which did not adhere to the surface of the mold were recovered. The molded article was taken out from the mold to which the granules had adhered, and then cooled. A cycle time for the molding procedure was measured and evaluated with the following criteria.

Evaluation Criteria
  ⊚: shorter than 90 seconds
  ○: shorter than 180 seconds
  x: 180 seconds or longer FIG. 1 shows a longer diameter distribution of the granules made by an underwater cutting method in one Example in Table 1, and a size distribution of the freeze-crushed powder in one Comparative Example in Table 1. FIGS. 2–5 are photographs of the granules and the powder. In FIG. 1, the abscissa axis shows the mesh size. A ratio of the granules which passed a 355 μm mesh screen and did not pass a 300 μm mesh screen was ninety nine wt % of the granules according to the invention. On the other hand, the size of the freeze-crushed powder varied widely from 75 to 355 μm. To narrow the size distribution, fractionation must be further performed, which results in a worse yield of the powder to thereby increase production costs. The present granules are uniform with a much sharper size distribution compared with that of the freeze-crushed powder. As seen in FIGS. 2 and 3, the present granule has a substantially spherical shape. As a result, it is superior in fluidity compared with the freeze-crushed powder having irregular shapes. Therefore, voids and pinholes in a molded article are avoided.

A size of the present granule is mainly determined by a size of an extruder die, but also depends somewhat upon a resin composition and a degree of crosslinking. In the present Examples 1–11, granules had diameters almost as large as the die, except Example 6 where the urethane resin content was higher. The longer diameter of the granule was determined as an average of the longer diameters of about 20 granules, measured in a photograph. The granules made of the olefinic elastomer in Comparative Example 7 and those made of the polyurethane resin alone in Comparative Example 9 had diameters about 1.5 times as large as the diameter of the die, so that they were not suitable for rotational powder molding due to their poorer flowability. In Comparative Example 4, the granules of the composition which had not been dynamically vulcanized had diameters larger by about 10% than the diameter of the die. The granules of the hydrogenated SBR in Comparative Example 3 had diameters larger by about 20% than the diameter of the die. This may be due to the fact that the hydrogenated SBR is a random copolymer.

Generally, a polyurethane resin hardens slowly, so that a molded article therefrom tends to deform if the article is taken out from a mold too early (see Comparative Examples 9 and 10). In the present invention, a polyurethane resin is blended with the dynamically vulcanized thermoplastic elastomer, so that a time for hardening was reduced, a shape of a molded article was preserved better at a high temperature, the molding cycle time was reduced and the mold's surface embossment was excellently reproduced on the molded article (Examples 2 to 6,9 and 10).

The granules of the compositions containing the polyurethane resin or the like in Examples 4 to 10 were superior in the oil resistance and the abrasion resistance, compared with the composition of the hydrogenated SBR in Comparative Example 3 and the completely crosslinked olefinic elastomer in Comparative Examples 7 and 8. Particularly, the granules from the composition of Example 6 showed almost the same level of abrasion resistance as that of the granules of the polyvinyl chloride resin. The oil resistance of the granules of the polyvinyl chloride resin in Comparative Example 6 was very good at ambient temperature, but worsened at a higher temperature. The poor abrasion resistance of the granules in Example 11 is considered to be due to the low miolecular weight of component (a).

INDUSTRIAL APPLICABILITY

As described above, the present granules
1) have a substantially spherical shape with a diameter of about 300 μm, so that they have excellent fluidity suited to rotational powder molding;
2) can be granulated consecutively after kneading, so that production costs can be much lower than costs of a conventional freeze-crushing process;
3) have better handling properties than freeze-crushed powder; and
4) provide molded articles which have excellent abrasion resistance, oil resistance, and are easy to recycle, when they contain a polyurethane resin.

TABLE 1

| | (Examples) | | | | | | | | | | |
|---|---|---|---|---|---|---|---|---|---|---|---|
| Component | Example 1 | Example 2 | Example 3 | Example 4 | Example 5 | Example 6 | Example 7 | Example 8 | Example 9 | Example 10 | Example 11 |
| (a) SEPS-1 | 100.0 | 100.0 | 100.0 | 100.0 | 100.0 | 100.0 | 100.0 | 100.0 | 100.0 | 100.0 | |
| (a) SEPS-2 | | | | | | | | | | | 100.0 |
| (b) Oil | 75.0 | 125.0 | 125.0 | 125.0 | 125.0 | 125.0 | 125.0 | 125.0 | 125.0 | 125.0 | 118.2 |
| (c) PP | 55.0 | 18.8 | 18.8 | 18.8 | 18.8 | 18.8 | 18.8 | 18.8 | 18.8 | 18.8 | 518.2 |
| Organic peroxide | 3.0 | 0.9 | 0.9 | 0.9 | 0.9 | 0.9 | 0.9 | 0.9 | 0.9 | 0.9 | 0.9 |
| Crosslinking aid | 5.4 | 1.7 | 1.7 | 1.7 | 1.7 | 1.7 | 1.7 | 1.7 | 1.7 | 1.7 | 1.7 |
| (d) Polyurethane resin | | 615.7 | 615.7 | 395.8 | 615.7 | 1055.5 | | | 369.4 | 615.7 | |
| (d) Polyester resin | | | | | | | 615.7 | | 246.3 | | |
| (d) Polyamide resin | | | | | | | | 615.7 | | | |
| (e) Glycidyl methacrylate | | | | 2.5 | 2.5 | 2.5 | | 2.5 | 2.5 | 2.5 | |
| (f) Maleic anhydride | | | | 2.5 | 2.5 | 2.5 | | 2.5 | 2.5 | 2.5 | |
| (g) PE | | | | | | | | | | 18.0 | |
| (h) Liquid polybutadiene | | | 12.5 | 12.5 | 12.5 | 12.5 | 12.5 | 12.5 | 12.5 | 12.5 | |
| hydrogenated SBR | | | | | | | | | | | 172.7 |
| PVC compound | | | | | | | | | | | |
| Completely cross-linked Olefinic Elastomer | | | | | | | | | | | |
| Polyurethane resin | | | | | | | | | | | |
| Molding method | U*1 | U | U | U | U | U | U | U | U | U | U |
| Average longer diameter (μm) | 300 | 300 | 300 | 300 | 300 | 350 | 300 | 300 | 300 | 300 | 300 |
| Distribution of longer diameter | Narrow | Narrow | Narrow | Narrow | Narrow | Narrow | Narrow | Narrow | Narrow | Narrow | Narrow |
| Bulk density | | | | 0.6 | 0.6 | 0.54 | | | | | |
| Fluidity | ⊚ | ⊚ | ⊚ | ⊚ | ⊚ | ⊚ | ⊚ | ⊚ | ⊚ | ⊚ | ⊚ |
| (seconds/50 g) | 8 | 9 | 9 | 10 | 9 | 10 | 8 | 9 | 9 | 9 | 8 |
| Moldability | ⊚ | ⊚ | ⊚ | ⊚ | ⊚ | ○ | ○ | ⊚ | ⊚ | ⊚ | ⊚ |
| Abrasion resistance (mm³) | ○ | ○ | ○ | ○ | ○ | ⊚ | ○ | ○ | ○ | ○ | X |
| | 98 | 98 | 98 | 90 | 70 | 45 | 97 | 90 | 75 | 90 | 150 |
| Oil resistance (%) | ○ | ○ | ○ | ○ | ○ | ⊚ | ⊚ | ⊚ | ⊚ | ○ | ○ |
| | 49 | 45 | 45 | 44 | 34 | 27 | 20 | 10 | 28 | 40 | 40 |

| | (Comparative Examples) | | | | | | | | | |
|---|---|---|---|---|---|---|---|---|---|---|
| Component | CE*2 1 | CE 2 | CE 3 | CE 4 | CE 5 | CE 6 | CE 7 | CE 8 | CE 9 | CE 10 |
| (a) SEPS-1 | 100.0 | 100.0 | | 100.0 | | | | | | |
| (a) SEPS-2 | | | | | 100.0 | | | | | |
| (b) Oil | 125.0 | 125.0 | 118.2 | 125.0 | 118.2 | | | | | |
| (c) PP | 18.8 | 18.8 | 518.2 | 18.8 | 518.2 | | | | | |
| Organic peroxide | 0.9 | 0.9 | 0.9 | | | | | | | |
| Crosslinking aid | 1.7 | 1.7 | 1.7 | | | | | | | |
| (d) Polyurethane resin | 395.8 | 1055.5 | | 395.8 | | | | | | |
| (d) Polyester resin | | | | | | | | | | |
| (d) Polyamide resin | | | | | | | | | | |
| (e) Glycidyl methacrylate | 2.5 | 2.5 | | 2.5 | | | | | | |
| (f) Maleic anhydride | 2.5 | 2.5 | | 2.5 | | | | | | |
| (g) PE | | | | | | | | | | |
| (h) Liquid polybutadiene | 12.5 | 12.5 | | 12.5 | | | | | | |
| hydrogenated SBR | | | 172.7 | | 172.7 | | | | | |

TABLE 1-continued

| | | | | | | | | | | |
|---|---|---|---|---|---|---|---|---|---|---|
| PVC compound | | | | | | 100 | | | | |
| Completely cross-linked Olefinic Elastomer | | | | | | | 100 | 100 | | |
| Polyurethane resin | | | | | | | | | 100 | 100 |
| Molding method | F*³ | F | U | U | F | *** | U | F | U | F |
| Average size (μm) | 150 | 150 | 350 | 320 | 200 | 150 | 450 | 170 | 500 | 180 |
| Size distribution | Wide | Wide | Narrow | Narrow | Wide | Narrow | Narrow | Wide | Narrow | Wide |
| Bulk density | 0.34 | 0.31 | | | | 0.61 | | | 0.6 | 0.39 |
| Fluidity | ○ | ○ | ⊚ | ⊚ | ○ | ⊚ | Δ | Δ | Δ | Δ |
| (seconds/50 g) | 26 | 24 | 8 | 10 | 22 | 8 | 31 | 31 | 29 | 29 |
| Moldability | ⊚ | ○ | ⊚ | ○ | ○ | ⊚ | ○ | ○ | X | X |
| Abrasion resistance | ○ | ⊚ | X | Δ | X | ⊚ | X | X | ⊚ | ⊚ |
| (mm³) | 90 | 45 | 250 | 110 | 250 | 20 | 150 | 150 | 2 | 2 |
| Oil resistance | ○ | ⊚ | X | Δ | X | X | ○ | ○ | ⊚ | ⊚ |
| (%) | 44 | 27 | 180 | 53 | D*⁴ | D | 40 | 40 | 16 | 16 |

U*¹: Underwater outting method
CE*²: Comparative example
F*³: Freeze-crushing method
D*⁴: Dissolved

What is claimed is:

1. A thermoplastic elastomeric resin granule for powder molding having a longer diameter of 300 to 355 μm and a ratio of the longer diameter to a shorter diameter of from 3:1 to 1:1, wherein said granule comprises a composition prepared by dynamically vulcanizing 100 parts by weight of (a) a block copolymer consisting of at least two polymeric blocks (A) composed mainly of a vinyl aromatic compound and at least one polymeric block (B) composed mainly of a conjugated diene compound, and/or a hydrogenated block copolymer obtained by hydrogenating said block copolymer, 20 to 300 parts by weight of (b) a non-aromatic softening agent for rubber, and 10 to 150 parts by weight of (c) polypropylene and/or a copolymer composed mainly of propylene.

2. The thermoplastic elastomeric resin granule for powder molding according to claim 1, wherein said composition is prepared by kneading a composition prepared by dynamically vulcanizing the components (a), (b) and (c), and 10 to 2,500 parts by weight of (d) at least one material selected from the group consisting of polyester polymers and copolymers, polyurethane polymers and copolymers, and polyamide polymers and copolymers, per 100 parts by weight of the component (a).

3. The thermoplastic elastomeric resin granule for powder molding according to claim 1 or 2, wherein the following components (e) and (f) are also dynamically vulcanized:

0.01 to 15 parts by weight of (e) an unsaturated glycidyl compound, and 0.01 to 15 parts by weight of (f) an unsaturated carboxylic acid or a derivative thereof selected from the group consisting of halides, amides, imides, anhydrides and esters, per 100 parts by weight of the component (a).

4. The thermoplastic elastomeric resin granule for powder molding according to any one of claims 1 to 3, wherein 5 to 100 parts by weight of (g) polyethylene and/or a copolymer composed mainly of ethylene per 100 parts by weight of the component (a) is also dynamically vulcanized.

5. The thermoplastic elastomeric resin granule for powder molding according to claim 1, wherein 1 to 30 parts by weight of (h) a liquid polybutadiene per 100 parts by weight of the component (a) is also dynamically vulcanized.

6. The thermoplastic elastomeric resin granule for powder molding according to claim 1, wherein the granule is prepared by an underwater cutting method.

* * * * *